US010791450B1

(12) United States Patent
Bakker

(10) Patent No.: US 10,791,450 B1
(45) Date of Patent: Sep. 29, 2020

(54) EMERGENCY SERVICES HANDLING

(71) Applicant: BlackBerry Limited, Waterloo, Ontario (CA)

(72) Inventor: Jan Hendrik Lucas Bakker, Fort Worth, TX (US)

(73) Assignee: BlackBerry Limited, Waterloo, Ontario (CA)

(*) Notice: Subject to any disclaimer, the term of this patent is extended or adjusted under 35 U.S.C. 154(b) by 0 days.

(21) Appl. No.: 16/741,082

(22) Filed: Jan. 13, 2020

Related U.S. Application Data

(63) Continuation of application No. 16/541,841, filed on Aug. 15, 2019.

(51) Int. Cl.
*H04W 4/90* (2018.01)
*H04W 60/00* (2009.01)
*H04W 36/00* (2009.01)

(52) U.S. Cl.
CPC ......... *H04W 4/90* (2018.02); *H04W 36/0022* (2013.01); *H04W 60/005* (2013.01)

(58) Field of Classification Search
None
See application file for complete search history.

(56) References Cited

U.S. PATENT DOCUMENTS

2011/0090872 A1* 4/2011 Dahlen ............ H04W 36/0022 370/332
2015/0358477 A1* 12/2015 Jeong .................... H04M 15/57 370/259
2016/0323931 A1* 11/2016 Huang .............. H04W 36/0022
2017/0230809 A1* 8/2017 Dm ....................... H04W 76/18
2017/0366955 A1* 12/2017 Edge ................ H04W 36/0022
2018/0041934 A1* 2/2018 Agarwal ............... H04W 36/08
2018/0132141 A1* 5/2018 Huang-Fu ......... H04W 36/0022
2018/0263066 A1* 9/2018 Chiang ............... H04L 65/1016
2019/0037448 A1* 1/2019 Shan ....................... H04W 4/46
2019/0037451 A1* 1/2019 Chaponniere ......... H04W 76/38
2019/0075511 A1* 3/2019 Ryu ...................... H04W 68/02

(Continued)

FOREIGN PATENT DOCUMENTS

WO 2018/231813 A1 12/2018

OTHER PUBLICATIONS

3GPP TS 23.060 V16.0.0 Technical Specification 3rd Generation Partnership Project; Technical Specification Group Services and System Aspects; General Packet Radio Service (GPRS); Service description; Stage 2 (Release 16) (Mar. 2019) (371 pages).

(Continued)

*Primary Examiner* — Chi H Pham
*Assistant Examiner* — Vladislav Y Agureyev
(74) *Attorney, Agent, or Firm* — Trop, Pruner & Hu, P.C.

(57) ABSTRACT

In some examples, a user equipment (UE) is registered with a fifth generation (5G) core network. In response to an emergency indication, the UE selects a first domain intended for a call responsive to the emergency indication. Subsequent to selecting the first domain, the UE attempts a combined registration with a second core network different from the 5G core network. In response to attempting the combined registration, the UE receives a further indication that the UE is registered for packet switched services but not circuit switched services. In response to the further indication, the UE selects an access network connected to a third core network to perform the call.

24 Claims, 5 Drawing Sheets

(56) References Cited

U.S. PATENT DOCUMENTS

| | | | | |
|---|---|---|---|---|
| 2019/0261261 | A1* | 8/2019 | Ishii | H04W 48/18 |
| 2019/0281506 | A1* | 9/2019 | Chiang | H04W 12/00512 |
| 2019/0281648 | A1* | 9/2019 | Liu | H04W 48/18 |
| 2019/0297121 | A1* | 9/2019 | Qiao | H04L 65/1069 |
| 2019/0297538 | A1* | 9/2019 | Keller | H04W 36/0022 |
| 2019/0313229 | A1* | 10/2019 | Chiang | H04L 65/1069 |
| 2019/0313469 | A1* | 10/2019 | Karampatsis | H04W 36/04 |
| 2019/0357037 | A1* | 11/2019 | Velev | H04W 60/00 |
| 2020/0015128 | A1* | 1/2020 | Stojanovski | H04W 8/08 |
| 2020/0053545 | A1* | 2/2020 | Wong | H04W 60/005 |
| 2020/0053830 | A1* | 2/2020 | Venkataraman | H04W 76/16 |
| 2020/0107230 | A1* | 4/2020 | Zhao | H04W 36/0066 |
| 2020/0154388 | A1* | 5/2020 | Koshimizu | H04W 88/06 |
| 2020/0178123 | A1* | 6/2020 | Shan | H04W 36/0016 |

OTHER PUBLICATIONS

3GPP TS 23.167 V15.4.0 Technical Specification 3rd Generation Partnership Project; Technical Specification Group Services and System Aspects; IP Multimedia Subsystem (IMS) emergency sessions (Release 15) (Dec. 2018) (64 pages).
3GPP TS 24.301 V16.1.1 Technical Specification 3rd Generation Partnership Project; Technical Specification Group Core Network and Terminals; Non-Access-Stratum (NAS) protocol for Evolved Packet System (EPS); Stage 3 (Release 16) (Jun. 2019) (565 pages).
3GPP TS 23.501 V16.1.0 Technical Specification 3rd Generation Partnership Project; Technical Specification Group Services and System Aspects; System Architecture for the 5G System; Stage 2 (Release 16) (Jun. 2019) (372 pages).
3GPP TS 24.229 V16.2.0 Technical Specification 3rd Generation Partnership Project; Technical Specification Group Core Network and Terminals; IP multimedia call control protocol based on Session Initiation Protocol (SIP) and Session Description Protocol (SDP); Stage 3 (Release 16) (Jun. 2019) (1111 pages).
3GPP TS 23.502 V16.1.1 Technical Specification 3rd Generation Partnership Project; Technical Specification Group Services and System Aspects; Procedures for the 5G System; Stage 2 (Release 16) (Jun. 2019) (500 pages).
3GPP TS 24.008 V16.1.0 Technical Specification 3rd Generation Partnership Project; Technical Specification Group Core Network and Terminals; Mobile radio interface Layer 3 specification; Core network protocols; Stage 3 (Release 16) (Jun. 2019) (812 pages).
3GPP TS 24.501 V16.1.0 Technical Specification 3rd Generation Partnership Project; Non-Access-Stratum (NAS) protocol for 5G System (5GS); Stage 3, (Jun 2019) (560 pages).
Bakker et al., U.S. Appl. No. 16/398,818 entitled Emergency Calls filed Apr. 30, 2019 (54 pages).
3GPP TSG-RAN WG5 Meeting #80, R5-184631, Gothenberg, Sweden, Change Request, 36.523-1, CR 4614, Current version: 15.2.0, Title: Adding TC 13.1.21 for emergency call via CS domain, Source to WG: NTT Docomo, Inc., Source to TSG: R5, Work Item Code: TE19_TEST, Aug. 20-24, 2018 (10 pages).
European Patent Office, International Search Report and Written Opinion for Appl. No. PCT/US2019/067530 dated Apr. 20, 2020 (15 pages).

* cited by examiner

EMERGENCY SERVICES HANDLING

CROSS REFERENCE TO RELATED APPLICATIONS

This is a continuation of U.S. application Ser. No. 16/541,841, filed Aug. 15, 2019, which is hereby incorporated by reference.

BACKGROUND

A mobile communications system can support communications of user equipments (UEs) using wireless access network nodes of the mobile communications system. Different types of mobile communications systems have been or are being deployed. Examples of different types of mobile communications systems include the following: a fifth generation (5G) mobile communications system, a fourth generation (4G) mobile communications system, a lower generation mobile communications system, and so forth. Access networks are used to access the services provided by a mobile communication system. Examples of different types of access networks include the following: a wireless local area network (LAN), a 5G access network, a 4G access network, a lower generation access network, and so forth.

BRIEF DESCRIPTION OF THE DRAWINGS

Some implementations of the present disclosure are described with respect to the following figures.

Figure 1:
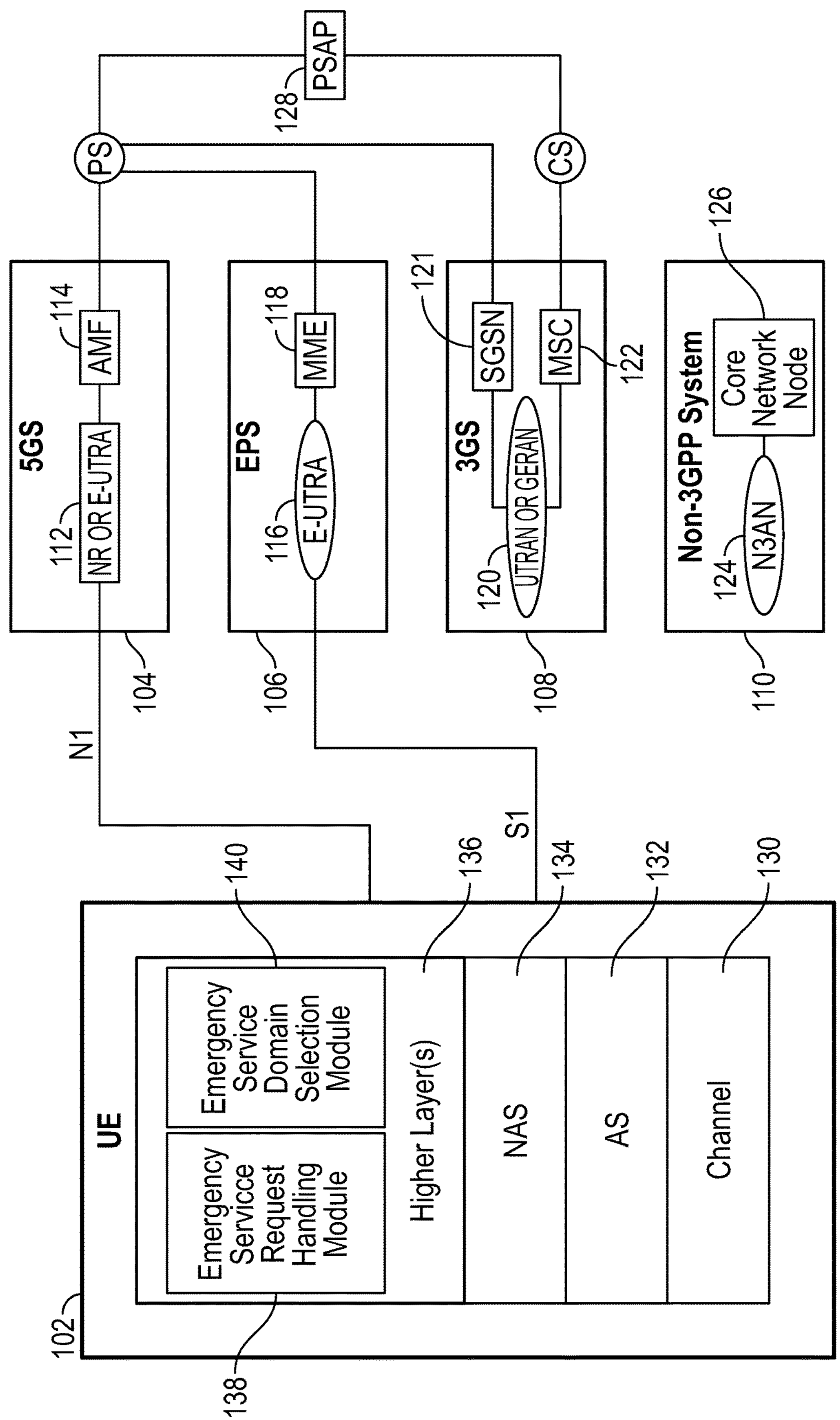
FIG. 1 is a block diagram of an example communication arrangement that includes different types of mobile communication systems, for supporting emergency services, in accordance with some implementations of the present disclosure.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

1. Introduction

An emergency call refers to a communication session that is to be handled by designated emergency entity, such as a police department, a fire department, a coast guard or marine guard, a mountain rescue agency, and so forth. An emergency call may be initiated by a user at a UE or by an application program running in the UE. Alternatively, an emergency call can be initiated by a different entity for the purpose of assisting a user or to otherwise indicate that an emergency condition exists that should be handled by the designated emergency entity.

An emergency call has to be handled within a small amount of time, which can be specified by a relevant regulator, government body, or standard body. In a region where there can be several different types of access networks or mobile communication systems, it is important that emergency calls are handled by the correct access networks or mobile communication system (e.g., a mobile communication system that actually supports emergency calls) and/or in a correct domain (e.g., a packet switched (PS) domain or a circuit switched (CS) domain, such as based on a preference or configuration of the UE or based on a rule, policy, standard, and so forth). Typically, a network operator configures the UE to select the correct domain, access network, or mobile communication system.

In the PS domain, a communication session such as an emergency call is handled using packet switching communications techniques, in which a voice data is carried using packets, and the corresponding voice call is established using signaling for the PS domain. In contrast, in the CS domain, a communication session such as an emergency call is established using dedicated circuits or communication channels through a CS network, and the corresponding voice call is established using signaling in the CS domain.

In the PS domain, the signaling for the PS domain that is used to setup a voice call can be according to the Session Initiation Protocol (SIP). SIP is used in an IM (IP (Internet Protocol) Multimedia) CN (Core Network) Subsystem (IMS). When SIP is used to setup a voice call, a UE sends a SIP INVITE request message to the network.

In some cases, various different types of mobile communication systems may be available in a particular geographic region to support communications sessions of UEs.

A fifth generation (5G) mobile communications system (referred to as a "5GS") can include one or more types of access networks including access networks supporting: (1) a New Radio (NR) access (which is a 5G access) that is connected to a 5G core network (5GC), and (2) an Evolved Universal Terrestrial Radio Access (E-UTRA) that is connected to the 5GC. Communication protocols employed by the 5GS are governed by standards from the Third Generation Partnership Project (3GPP). The 5GC is part of the 5GS. In this disclosure, 5GC and 5GS are sometimes used interchangeably.

A 5G access network includes a NextGen Radio Access Network (NG-RAN) and/or a non-3GPP access network connected to the 5GC.

An NG-RAN includes a radio access network that supports one or more of the following options with the common characteristics that the radio access network connects to a 5GC: 1) Standalone New Radio, 2) New Radio is the anchor with E-UTRA extensions, or 3) Standalone E-UTRA.

A non-3GPP access network refers to an access network that operates according to a protocol different from a protocol defined by the 3GPP. For example, a non-3GPP access network can include a wireless local area network (WLAN) that operates according to the Institute of Electrical and Electronics Engineers (IEEE) 802.11 standards. As other examples, a non-3GPP access network can include a 1× access network (e.g., a Code Division Multiple Access (CDMA) access network).

The 5GC includes core network nodes, including an Access and Mobility Management Function (AMF), a User Plane Function (UPF), and other core network nodes.

A 4G mobile communications system (referred to as an Evolved Packet System (EPS)) includes a 4G access network supporting E-UTRA that is connected to a 4G core network. A 4G core network is referred to as an Evolved Packet Core (EPC). EPC refers to a framework that supports converged voice and data in an EPS, such as a Long Term Evolution (LTE) system. The 4G core network (EPC) includes a Mobility Management Entity (MME), a Packet Data Network Gateway (PDN-GW), and other core network nodes. The AMF and MME are control nodes in the respective 5G and 4G mobile communications systems. The AMF and MME are responsible for UE paging, bearer activation and the activation, and performance of other control functions. The UPF or PDN-GW is a point of exit or entry for data traffic of a UE. The EPC is part of the EPS. In this disclosure, EPC and EPS are sometimes used interchangeably.

In other examples, other types of mobile communication systems include a General Packet Radio Service (GPRS) system, a Global System for Mobile (GSM) system, and so forth. Access networks for such other types of mobile communication systems include a Universal Mobile Telecommunications Service (UMTS) Terrestrial Radio Access Network (UTRAN), a GSM Enhanced Data Rates for GSM Evolution (EDGE) Radio Access Network (GERAN), and so forth.

In case a particular mobile communications system does not support an emergency service, emergency service fallback can be performed. An emergency service refers to a service provided by a mobile communications network to support an emergency call.

An emergency service fallback can refer to a service fallback. A service fallback can refer to a system fallback or an access fallback. An emergency service fallback can thus refer to an emergency system fallback or an emergency access fallback.

A(n emergency) system fallback refers to using a different mobile communication system to provide a(n emergency) service when a particular mobile communication system is unable to support the (emergency) service. A system fallback causes a UE to select a different system, such as from a 5GS to an EPS.

Another type of service fallback is an access fallback, which causes a UE to select a different type of access of the same system, such as from an NR access to an E-UTRA that are both connected to the 5G core network (5GC).

A registration refers to a registration with the IMS, with the EPC or EPS, or with the 5GC or 5GS. A registration with the IMS involves sending a SIP REGISTER request message to the network. Alternatively, a registration can include a 5GS non-access stratum (NAS) registration procedure or an EPC NAS registration procedure. A NAS registration procedure is performed by the UE to gain access to a mobile communication system, such as the 5GS or EPS. A registration with the EPC, EPS, 5GC, or 5GS involves an initial registration or a periodic or subsequent registration. An initial registration with the EPC or EPS involves an attach procedure which involves sending ATTACH REQUEST message to the network. A periodic or subsequent registration with the EPC or EPS involves a tracking area update (TAU) procedure which involves sending a TAU REQUEST message to the network. An initial registration, periodic or subsequent registration with the 5GC or 5GS involves sending a REGISTRATION REQUEST message to the network.

2. Example Types of Fallbacks

The following provides various example types of system fallbacks.

2.1 System Fallback 2.1A 5GS to EPS Handover

A first example of system fallback is a 5GS (5G mobile communication system) to EPS (4G mobile communication system) fallback, implemented by performing a 5GS to EPS handover procedure from 5GS to EPS when an N26 interface is supported. A UE can perform a Tracking Area Update (TAU) procedure in the E-UTRA, which is part of EPS (which is an S1-based handover). The N26 interface is an interface between the AMF and the MME. Note that the N26 interface may not be supported by some deployments that include 5GS and EPS. An S1 interface refers to the interface between a UE and an EPC.

2.1B Inter-System Redirection to EPS with N26 Interface

A second example of system fallback is 5GS to EPS fallback, implemented by performing an inter-system redirection from 5GS to EPS that has the N26 interface between the MME and the AMF (i.e., the N26 interface is supported). The inter-system redirection is based on idle mode mobility from the 5GC to the EPC. A UE performs a TAU procedure or (initial) Attach procedure in the E-UTRA, which is part of EPS (i.e. E-UTRA connected to EPC). Idle mode mobility of a UE refers to mobility of the UE while the UE is in the idle mode (i.e., not actively connected in a communications session).

If a UE performs a TAU procedure with an MME that does not support interworking without the N26 interface, the MME rejects the TAU and the UE, upon receiving the message indicating the rejected TAU, proceeds with an Attach request as described below in a third example of system fallback.

2.1C Inter-System Redirection to EPS without N26 Interface

The third example of system fallback is a 5GS to EPS fallback, implemented by performing an inter-system redirection from 5GS to EPS without the N26 interface between the MME and the AMF. 5GS to EPS redirection can be performed by a UE in single-registration mode or dual registration mode. A UE in a single-registration mode is registered with just one mobile communication system (5GS or EPS), while a UE in a dual-registration mode is registered with two mobile communication systems, such as with both the 5GS and the EPS. For example, the UE operating in the single-registration mode can start a registration procedure with the EPC or EPS with sending a TAU REQUEST message or ATTACH REQUEST message. To preserve Internet Protocol (IP) addresses, the UE operating in the single-registration mode can start the registration procedure with the EPC or EPS with sending the ATTACH REQUEST message.

The UE supporting the dual-registration mode can start a initial registration procedure with EPS or EPC with sending an ATTACH REQUEST message. The UE supporting the dual-registration mode may start the initial registration procedure with the other system (e.g. 5GS or 5GC) at any time.

2.2 CS Fallback

A further example of a fallback is a circuit switched fallback (CSFB) from the EPS to a mobile communication system that supports circuit switched (CS) communications.

The CSFB may be supported by an EPC. For CSFB, a UE performs a combined registration procedure with the EPC, such as by performing a combined Attach or a combined TAU procedure with the MME. A combined registration registers the UE with the EPC and with a mobile switching center (MSC). The MME is part of the EPC. The MME then registers the UE with the MSC, such as by using an SGs interface. The MSC provides access to the CS domain and the services of the CS domain. The MSC is part of a mobile communication system (e.g., GPRS system) that supports CS communications, as well as possibly PS communications.

2.3 Domain Selection

Some mobile communication systems provide access to CS domain or PS domain or both. A 5GS does not provide access to the CS domain but the 5GS may provide access to an EPS (via system fallback). The EPS, using CSFB, allows access to the CS domain of a GPRS, GSM or 1× (e.g., CDMA) system. CS and PS domain access may be provided by a GPRS or GSM system. CS domain access may be provided by a 1× system.

3. Issues 3.1 Issue 1: Registration Accepted but CFSB not Possible

When a UE performs system fallback at the behest of the mobile communication system, the UE may learn during a successful registration procedure with the mobile communication system that CSFB is not possible.

During a successful registration procedure, an access network of the mobile communication system can provide an indication relating to emergency services to the UE. During a successful NAS registration procedure, the UE's request to register sent during the registration procedure is accepted by means of, sending by the network and receiving at the UE, a registration accept message. REGISTRATION ACCEPT message, TAU ACCEPT message ATTACH ACCEPT message are examples of a registration accept message. For example, an NR access network or an E-UTRA of a 5GS can provide the indication in a REGISTRATION ACCEPT message of the 5GS NAS registration procedure.

The indication relating to emergency services can include a value from Table 1 below, for example, which is according to 3GPP TS 24.501. Table 1 shows a 5GS network feature support information element.

TABLE 1

| Emergency service support indicator for 3GPP access (EMC) (octet 3, bit 3 and bit 4)<br>This bit indicates the support of emergency services in 5GS for 3GPP access (see NOTE 2) | | |
|---|---|---|
| Bits | | |
| 4 | 3 | |
| 0 | 0 | Emergency services not supported |
| 0 | 1 | Emergency services supported in NR connected to 5GCN only |
| 1 | 0 | Emergency services supported in E-UTRA connected to 5GCN only |
| 1 | 1 | Emergency services supported in NR connected to 5GCN and E-UTRA connected to 5GCN |
| **Emergency service fallback indicator for 3GPP access (EMF) (octet 3, bit 5 and bit 6)<br>This bit indicates the support of emergency services fallback for 3GPP access (see NOTE 2)** | | |
| Bits | | |
| 6 | 5 | |
| 0 | 0 | Emergency services fallback not supported |

TABLE 1-continued

| | | |
|---|---|---|
| 0 | 1 | Emergency services fallback supported in NR connected to 5GCN only |
| 1 | 0 | Emergency services fallback supported in E-UTRA connected to 5GCN only |
| 1 | 1 | Emergency services fallback supported in NR connected to 5GCN and E-UTRA connected to 5GCN |
| **Interworking without N26 interface indicator (IWK N26) (octet 3, bit 7)<br>This bit indicates whether interworking without N26 interface is supported** | | |
| Bit | | |
| 7 | | |
| 0 | | Interworking without N26 interface not supported |
| 1 | | Interworking without N26 interface supported |

As another example, the indication provided by an EPS in an EPC NAS registration procedure can be included in an ATTACH ACCEPT response message or in a TRACKING AREA UPDATE ACCEPT response message. As an example, the indication can include a value from Table 2 below, which is according to 3GPP TS 24.301.

TABLE 2

| Emergency bearer services indicator (EMC BS) (octet 3, bit 2) | |
|---|---|
| Bit | |
| 2 | |
| 0 | emergency bearer services in S1 mode not supported |
| 1 | emergency bearer services in S1 mode supported |

In Table 1 or Table 2 above, in some cases, a UE may prefer (e.g. pre-configured by the UE vendor) to perform CSFB for performing an emergency call. A UE preferring to perform CSFB refers to a configuration (set by a user or other entity) of the UE that specifies that an emergency call has to use CSFB.

If the indication provided by the mobile communication system during a successful registration procedure with the mobile communication system indicates that CSFB is not possible, then the UE would not be able to use the CS domain by means of performing CSFB to perform an emergency call, which may result in failure to establish the emergency call. As a further example, not limited to CSFB, Table 1 above can specify that emergency services fallback is not supported.

3.2 Issue 2: Delay in Emergency Call Setup for (Concurrent) Dual Registration Capable UE In some cases, a UE is dual registration capable, which means that the UE is capable of performing dual registration with two different types of mobile communication systems, such as with a 5GS and an EPS. The dual registration with the two different types of mobile communication systems can be a concurrent dual registration, for example, in which the UE is registered with the two mobile communication systems at the same time.

A dual registration capable UE can be registered via a 5G access network with the 5GC. If the 5GS does not support a "native" initiation of emergency services (i.e., the 5GS does not support emergency services using the 5G access network), then the UE (assuming that the UE has not yet registered with the EPC of the EPS) may experience a delay when performing system fallback to set up an emergency call setup. The UE may learn that the 5GS does not support emergency services based on an indication such as according to Table 1 above. This indication may be provided during a successful 5GS NAS registration procedure.

A dual registration capable UE can be registered via a 4G access network with the EPC. If the EPS does not support a "native" initiation of emergency services (i.e., the EPS does not support emergency services using the 4G access network), then the UE (assuming that the UE has not yet registered with the 5GC of the 5GS) may experience a delay when performing system fallback to set up an emergency call setup. The UE may learn that the 4GS does not support emergency services based on an indication such as according to Table 2 above. This indication may be provided during a successful EPS NAS registration procedure.

Alternatively, a UE registered via a 4G access network with the EPC may perform CSFB procedures.

3.3 Issue 3: Fallback Procedure does not Match Domain Specified by UE

In some cases, the UE may be configured to select a specific domain (e.g., the CS domain) to perform a call for an emergency service. This configuration of the UE may not be known to the mobile communication system. Thus, when performing fallback, such as assisted fallback (e.g., a handover or redirection, such as according to sections 2.1A-2.1C or access fallback or redirection (such as the CS fallback).

The mobile communication system can set an emergency call domain selection configuration at the UE (for selecting a PS domain or CS domain for emergency services). However, the mobile communication system may not be aware that the UE has been pre-configured to use a specific domain or that a UE may select a different domain than that configured by the mobile communication system or that specific type of emergency service requested is supported via the CS domain. For example, the UE may have to use the CS domain for the emergency call, which may not be known to the mobile communication system. In this case, the mobile communication system may not cause an access fallback or redirection to the CS domain, which can delay the emergency call setup.

4. Example Implementations

The following describes example implementations for addressing the various issues identified above, and any other issues. It is noted that the various different implementations can be performed as standalone implementations, or can be combined in some manner.

FIG. 1 is a block diagram of an example communication arrangement to allow a UE 102 to perform communications (including an emergency call) over various different types of mobile communication systems. In the example of FIG. 1, the UE 102 may be able to communicate with any one or more of a 5GS 104, an EPS 106, a 3G system (3GS) 108, and a non-3GPP system 110.

The 5GS 104 includes an NR access network and/or an E-UTRA 112, which is connected to an AMF 114. Other core network nodes of the 5GS 104 are not depicted for better clarity.

The EPS 106 includes an E-UTRA 116 that is connected to an MME 118. Other core network nodes of the EPS 106 are not depicted for better clarity.

The 3GS 108 includes a UTRAN and/or GERAN 120 that is connected to a Serving GPRS Support Node (SGSN) and an MSC 122. The 3GS can also be referred to as GPRS or GSM, for simplicity.

The non-3GPP system 110 includes a non-3GPP access network 124 (e.g., a WLAN or a 1× access network), and a non-3GPP core network node 126. The non-3GPP core network node, shown separately for simplicity, may be part of another system, e.g. EPS (where the node is named ePDG) or 5GS.

As further shown in FIG. 1, a Public Safety Answering Point (PSAP) 128 represents an entity that is to answer an emergency call. For example, the PSAP can be part of or be able to connect to a police department, a fire department, a 911 call center, or any other entity to handle calls for emergency service(s).

The 5GS 104, the EPS 106, the 3GS 108 (more specifically, the SGSN 121) may be able to support PS domain emergency services with the PSAP 128. The 3GS 108 (more specifically, the MSC 122) is also able to support CS domain emergency services with the PSAP 128.

The AMF 114, the MME 118, and the SGSN 121 enable access to the PS domain. While the SGSN allows core network access to the PS domain, in practice no PS voice or PS emergency services are supported via the SGSN 121, UTRAN 120, or GERAN 120.

The MSC 122 enables access to the CS domain.

As shown in FIG. 1, the UE 102 is connected to the access network 112 of the 5GS 104 supported by an N1 interface, and is connected to the access network 116 of the EPS 106 supported by an S1 interface.

Not shown in FIG. 1, between the MME and AMF there can be the N26 interface. Between the MME and MSC there can be the SGs interface.

4.0 UE Arrangement

The UE 102 is configured to detect a request for an emergency service, and to select a domain (CS domain or PS domain) for the emergency service (assuming the UE supports multiple domains).

A request for an emergency service may be in the form of a dialed number, as dialed by a user at the UE 102 for example, or as indicated based on activation of a user interface element. The term dialed number does not exclude the situation where a number has been selected otherwise, e.g., as part of a digital contact book application residing on the UE 120. Alternatively, the numbers or digits of an emergency number can be received from an internal application of the UE 120, or from an external interface. The dialed number can be part of a string, where the string can include digits and/or alphanumeric characters. This string may be encoded as a Uniform Resource Identifier (URI).

The selection of a domain for a request for an emergency service may be based on domain priority and rules and exceptions implemented at the UE 102. The domain selected by the UE 102 according to the domain priority and rules and exceptions can be based on a type of access network used to make the emergency call, an attach/registration status to the CS or PS domain of the UE 102, and/or the network support for IP Multimedia Subsystem (IMS) emergency and IMS voice over PS. An IMS includes network elements supporting the Session Initiation Protocol (SIP). A network element of the IMS can include a Proxy Call Session Control Function (P-CSCF), for example.

The IMS can provide emergency services via the PS domain. The IMS can provide voice services via the access used, depending on the access and an "IMS voiceover PS" indicator. The "IMS emergency support" indicator, such as in Table 1 (e.g., EMC or EMF indicator) or 2 (e.g., EMC BS indicator) above, and the "IMS voice over PS" indicator are received by the UE during an NAS registration procedure.

The priority and selection rules and exceptions according to some examples are provided in Table 3 below, which is according to 3GPP TS 23.167. In this disclosure, E-UTRAN refers to E-UTRA connected to EPC.

TABLE 3

| | CS Attached | PS Attached | VoIMS | EMS | First EMC Attempt | Second EMC Attempt |
|---|---|---|---|---|---|---|
| A | N | Y | Y | Y | PS | CS if available and supported - NOTE 7) |
| B | N | Y | N | Y | PS or CS if the emergency session includes at least voice. PS if the emergency session contains only media other than voice. | PS if first attempt in CS CS if first attempt in PS - NOTE 7) |
| C | N | Y | Y or N | N | PS if ESFB is "Y" (NOTE 5). Else CS or PS for another 3GPP RAT with EMS or ESFB set to "Y" if available and supported and if the emergency session includes at least voice. Else PS for another 3GPP RAT with EMS or ESFB set to "Y" if available and supported if the emergency session contains only media other than voice. | PS if first attempt in CS CS if first attempt in PS - NOTE 7) |
| D | Y | N | Y or N | Y or N | CS if the emergency session includes at least voice. PS if available and EMS or ESFB is "Y" and emergency session contains only media other than voice. | PS if available and EMS or ESFB is "Y" |
| E | Y | Y | Y | Y | If the emergency session includes at least voice, follow rules in TS 22.101 [8] which say to use the same domain as for a non-EMC (NOTE 2) PS if the emergency session contains only media other than voice. | PS if first attempt in CS CS if first attempt in PS |
| F | Y | Y | Y or N | N | PS if ESFB is "Y" (NOTE 5). Else PS for another 3GPP RAT with EMS if available and supported or CS, if the emergency session includes at least voice, | CS if first attempt in PS PS for another 3GPP RAT if available and supported and EMS or ESFB is "Y" if first attempt in CS. |
| G | Y | Y | N | Y | CS if the emergency session includes at least voice. PS if the emergency session contains only media other than voice. | PS |

EMC = Emergency Session. EMC includes also normal calls initiated in the CS domain that are treated by the CS CN as emergency calls.
VoIMS = Voice over IMS over PS sessions support as indicated by IMS Voice over PS session supported indication as defined in TS 23.401 [28], TS 23.060 [2] and TS 23.502 [49].
EMS = IMS Emergency Services supported as indicated by Emergency Service Support indicator as defined in TS 23.401 [28], TS 23.060 [2], TS 23.501 [48] and TS 23.502 [49].
ESFB = Emergency Services Fallback for 5GS as defined in TS 23.501 [48] and TS 23.502 [49].

NOTE 1:
If the UE selects the CS domain and initiates a normal call using the dialled local emergency number (see clause 7.1.2), and the UE enters limited service state (e.g. due to a Location Registration failing), then the UE camps on an acceptable cell (see TS 23.122 [41]) and may proceed with the EMC by initiating an emergency call in limited service state.

NOTE 2:
Use of the same domain as for a non-EMC is restricted to UTRAN, E-UTRAN and NG-RAN access (e.g. excludes WLAN).

NOTE 3:
This NOTE applies to a UE in dual registration mode as defined in TS 23.501 [48]. A dual registration mode UE that is registered to both EPC and SGC assumes attachment, for the purpose of the "PS Attached" column, to whichever of EPC or SGC indicates EMS as "Y". When both EPC and 5GC indicate EMS as "Y", the UE shall assume attachment to either EPC or 5GC based on implementation. A UE that is registered to both EPC and 5GC does not use emergency services fallback and ignores the ESFB condition when performing domain selection.

NOTE 4:
The other 3GPP RAT for row C and row F can be any of UTRA, E-UTRAN connected to EPC, E-UTRA connected to SGC or NR connected to SGC that is supported by the UE and differs from the RAT to which the UE is currently attached in the PS domain (or is assumed to be attached based on NOTE 3).

NOTE 5:
The condition 'ESFB is "Y" only applies for a UE that is camped on or connected to 5GS via NR or via E-UTRA and that supports Emergency Services Fallback. In that case the emergency call will be provided over E-UTRAN or E-UTRA connected to 5GC as defined in procedures in TS 23.502 [49]. The condition 'ESFB is "Y" is taken into consideration by the UE only when the network has indicated EMS = "N" for the RAT on which the UE is camping or connected.

NOTE 6:
For 5GS, the value of the column "EMS" is for the RAT that UE is camped on or is connected to.

NOTE 7:
As an implementation option, when the first attempt uses PS and fails for reasons other than related to IMS, the second attempt may use PS with a different 3GPP RAT. In this case the UE, can make a third attempt using CS.

In other examples, other types of rules and priorities may be employed.

FIG. 1 further shows example layers in the UE 102, including a channel layer 130 to communicate over a wireless medium, an access stratum (AS) layer 132, an NAS layer 134, and one or more higher layers 136. The one or more higher layers 136 can include an emergency service request handling module 138 for handling a emergency call request initiated at the UE 102, such as by a user dialing a specific number or by an application program initiating an emergency call. The one or more higher layers 136 can also include an emergency service domain selection module 140, which can select a domain (CS domain or PS domain), such as according to priorities and rules set forth in Table 3 above.

The one or more higher layers 138 can include an application layer or any other type of layer.

Based on the processing performed by the modules 138 and/or 140, the NAS layer 134 or AS layer 132 or other lower layer may receive from the one or more higher layers 136 a request for CS emergency service (to make an emergency call in the CS domain), a request for PS emergency service (to make an emergency call in the PS domain), a request for emergency service fallback (to perform fallback to a different mobile communication system or domain to perform the emergency call), or a request for emergency CSFB. When a request for PS emergency service is received at the NAS, the lower layers select or request a PDU session or PDN connection suitable for sending a SIP INVITE request and/or a SIP REGISTRATION request. The SIP INVITE will obtain a session with suitable media to communicate with personnel at e.g. a PSAP. The SIP INVITE request and/or a SIP REGISTRATION request are not considered to messages originated or terminated within the NAS. Rather they are considered to originated or terminated within the IMS.

4.1 Implementation 1 for CSFB not Allowed or not Possible

In some examples, implementation 1 below can be used to address Issue 1 discussed further above.

In general, a UE can detect an emergency indication by detecting that a number (which matches an emergency number) has been selected or entered or received. Alternatively, a request for emergency services may be received from the upper layers of the UE or a request for emergency services may be pending (see section 4.0 above).

Upon identifying the domain to be used to fulfill the emergency service request, registration with another system, e.g., EPS, may be initiated. However, even though registration for EPS services can be successful, accessing (by means of CSFB) the CS domain may not be possible.

In accordance with some implementations of the present disclosure, in cases where the UE determines that the 5GS has indicated to the UE 102 that CFSB is not allowed or not possible (e.g. the UE determines it is registered for EPS services only), the UE 102 can nevertheless perform an emergency call in the CS domain.

Figure 2:
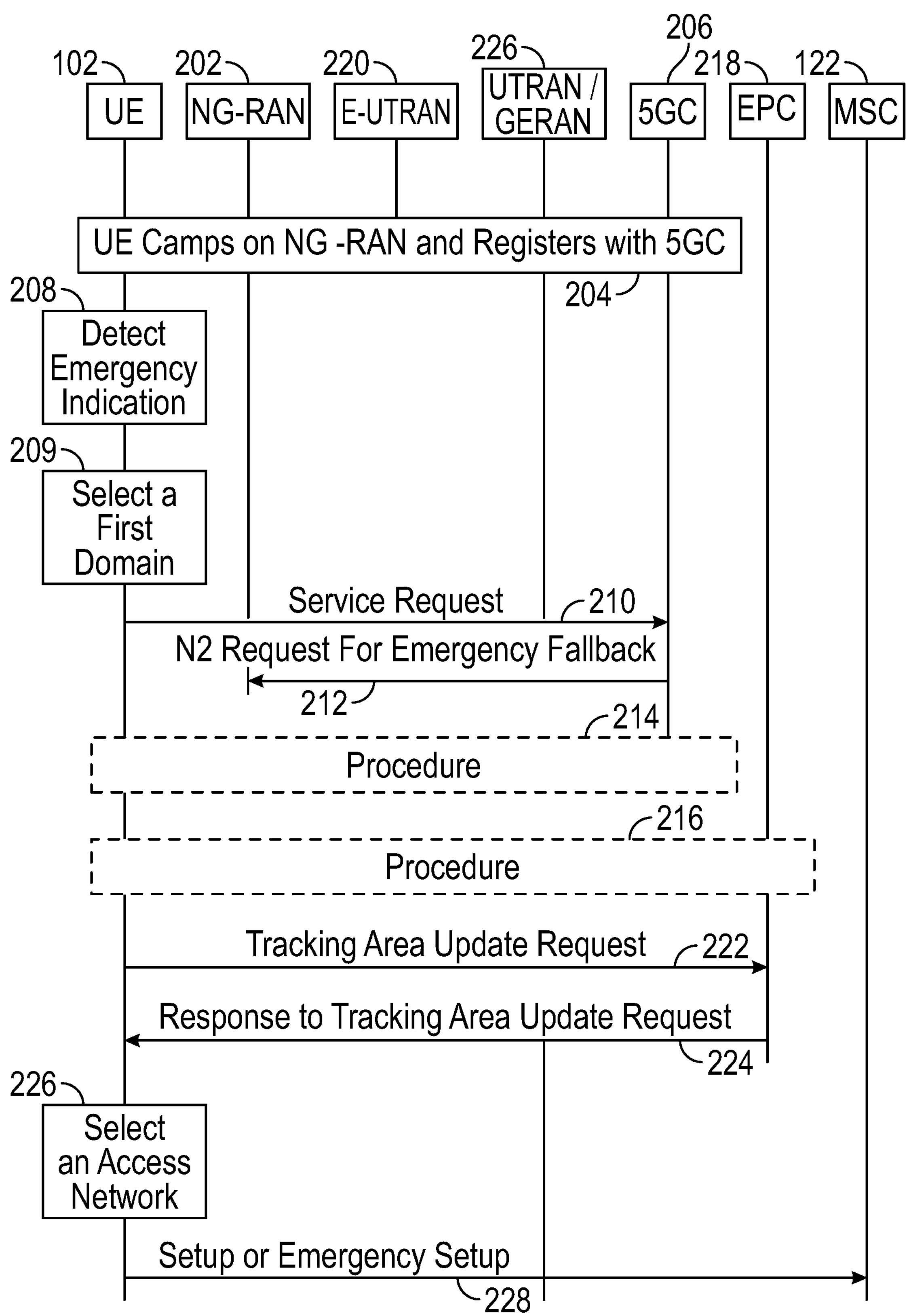
FIG. 2 is a message flow diagram of a process according to some implementations of the present disclosure.

FIG. 2 is a message flow diagram of a process according to some examples to provide Implementation 1.

The UE 102 camps on an NG-RAN (5G access network) 202 of a 5GS, and registers (at 204) with the 5GC 206 of the 5GS. The UE 102 detects (at 208) an emergency indication, such as based on a dialed emergency number and so forth.

In response to or subsequent to the emergency indication, the UE 102 selects (at 209) a first domain (e.g., the CS domain) to be used for an emergency call responsive to the emergency indication.

If the AMF of the 5GC 206 has indicated support for emergency services using fallback via a Registration Accept message for a radio access technology (RAT) of the NG-RAN (see e.g., Table 1), the UE 102 sends (at 210) a Service Request message indicating that the UE 102 needs to perform emergency services fallback.

The AMF triggers a request for emergency services fallback by executing a procedure at the NG-RAN 202. In the procedure, the AMF sends (at 212) an indication (e.g., in the form of an N2 request for emergency fallback) to indicate to the NG-RAN 202 that this is a fallback for emergency services. The N2 request is a message.

The AMF based on the support of emergency services in the EPC or the 5GC may indicate, in the N2 request, the target core network, which allows the NG-RAN 202 to determine whether inter-RAT fallback (e.g., fallback from one RAT to another RAT, such as from NR to E-UTRA within 5GS)) or inter-system fallback (e.g., from the 5GS to the EPS) is to be performed. When the AMF initiates a redirection for a UE that has been successfully authenticated, the AMF includes the security context in the N2 request to trigger fallback.

Based on the target core network indicated in the message sent at 212, one of procedures 214 and 216 is executed by the NG-RAN 202. Procedure 214 is performed if the target core network is the 5GC 206. Procedure 216 is performed if the target core network is the EPC 218.

In procedure 214, the NG-RAN 202 initiates inter-RAT handover or Radio Resource Configuration (RRC) redirection to a cell of an E-UTRA 220 connected to the 5GC 206, if the UE 102 is currently camped on the NR access network.

In procedure 216, the NG-RAN 202 initiates inter-system handover or RRC redirection from the NG-RAN 202 connected to the 5GC 206 to the E-UTRA 220 connected to the EPC 218. The NG-RAN 202 uses the security context provided by the AMF to secure the redirection procedure 216.

If the redirection procedure is used either in procedure 214 or 216, the target core network type (e.g., EPC or 5GC) is also conveyed to the UE 102 in order to be able to perform the appropriate NAS procedures (S1 mode for EPC or N1 mode for 5GC). The UE 102 includes an emergency indication in an RRC message to the E-UTRA 220, and the E-UTRA 220 provides the emergency indication to the AMF (during registration triggered in procedure 214), and the MME that is part of the EPC 218 (during a TAU process triggered in procedure 216). Both registration and TAU requests should contain a follow-on request and active flag, respectively, to indicate that the UE 102 has user data pending.

In the case that the UE 102 is inter-system handed over or RRC redirected to the E-UTRA 220 connected to the EPC 218 (i.e., procedure 216), in response to or subsequent to selecting the first domain (e.g., CS domain), the UE 102 attempts (at 222) a combined registration (such as by sending a combined TAU request) with the EPC 218 (different from the 5GC to which the UE 102 is currently registered). The combined registration registers the UE 102 with the EPC 218 and the MSC 122 (or more generally, registers the UE 102 with multiple different core networks concurrently). The EPC 218 provides at least one of EPS services or fallback to the first domain (e.g., CS domain). The combined TAU request can be sent to the MME 118 in the EPC 218.

The UE 102, in response to attempting the combined registration (222), receives (at 224) a further indication (e.g., a TAU response that is responsive to the TAU request sent at 222) that the UE 102 is registered for PS services (e.g., EPS services) but not CS services. For example, the further indication can indicate that the UE 102 is registered for EPS services only.

In response to the further indication, the UE 102 selects (at 224) an access network (e.g., the UTRAN or GERAN 226) connected to a third core network (e.g., the core network of the 3GS 108 of FIG. 1) to perform a call for emergency services.

After performing 214 or after performing 216, 222, and 224, the UE 102 can send (at 228) a SETUP message or an EMERGENCY SETUP message to the selected access network. The SETUP message or the EMERGENCY SETUP message is to indicate the call for emergency services is performed using the MSC 122 in the first domain (e.g., CS domain), without using fallback to the first domain (e.g., CSFB).

In some implementations, the first domain is a packet switched domain (for example, the UE selects the packet switched domain in response to detecting an emergency indicator). The UE determines that the second core network (e.g., EPC) does not support emergency (bearer) service(s) (e.g., based on the indicator in Table 2). Then the UE uses a circuit switched domain of the third core network (e.g., UTRAN or GERAN) to perform the call.

The following provides a modification of a section of 3GPP TS 24.301 (underlined text represents new additions).

5.5.3.3.4.3 Combined tracking area updating successful for EPS services only.

Apart from the actions on the tracking area updating attempt counter, the description for tracking area for EPS services as specified in subclause 5.5.3.2.4 shall be followed. In addition, the following description for location updating for non-EPS services applies.

If there is a request for emergency services pending, a CS fallback emergency call pending or a CS fallback call pending due to emergency domain selection or emergency services fallback (see 3GGP TS 23.502), then the UE shall attempt to select GERAN or UTRAN radio access technology, select between EMERGENCY SETUP message or a SETUP message, and proceed with appropriate MM or GMM specific procedures.

4.2 Implementation 2

Certain UEs that support 5G operations can be concurrently registered (with 5GC) and attached (with EPC). Such a UE can maintain one registration context with the 5GC and one registration context with the EPC. The UE does not have to be continuously concurrently registered and attached. However, this type of UE may prefer performing the attachment procedure with the EPC over performing a fallback or redirection, followed by a TAU procedure.

Implementations 2.1-2.3 below can be used to address Issue 2 discussed further above, in some examples.

4.2.1 Implementation 2.1: Optimization for (Concurrently) Dual Registered Devices To enable the performance of Implementation 2.1, the UE 102 is assumed to be capable of being concurrently registered with different first and second core networks (e.g., the 5GC and the EPC). The N26 interface between the 5GC and the EPC may or may not be supported.

To reduce delays for establishing an emergency call in scenarios where the native initiation of emergency services is not supported by the network or the UE, (Issue 2 discussed above), Implementation 2 seeks to skip or omit tasks 210 and 212 depicted in FIG. 2.

Figure 3:
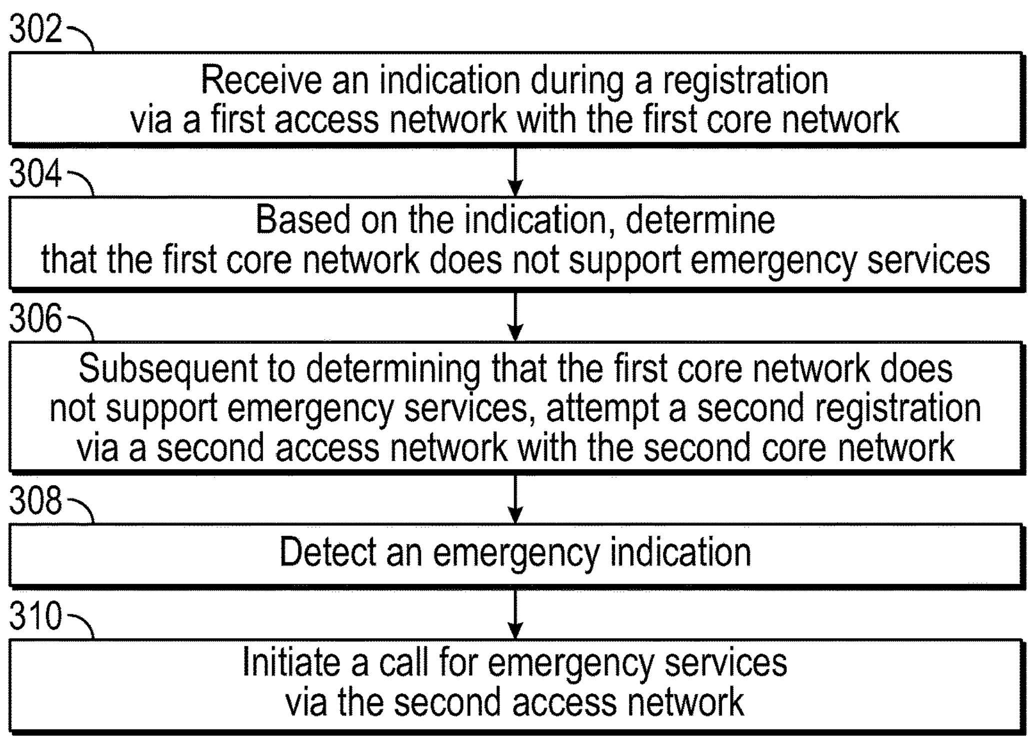
FIGS. 3-5 are flow diagrams of processes performed by a user equipment (UE) according to various examples.

FIG. 3 is a flow diagram of a process of the UE 102 according to some examples for Implementation 2.1. The process can be performed by machine-readable instructions stored in a machine-readable storage medium of the UE 102 and executed on one or more processors of the UE 102.

The UE 102 receives (at 302) an indication (such as in a response message) during a registration via a first access network with the first core network (e.g., 5GC).

Based on the indication, the UE 102 determines (at 304) that the first core network does not support emergency services, such as in an emergency service indicator (e.g., EMC indicator in Table 1) for 3GPP access, for example. In some cases, the indicator indicating that emergency services are not supported by the first core network can include an indication that emergency services are not supported by an access network connected to the first core network.

In response to determining that the first core network does not support emergency services, the UE 102 attempts (at 306) a second registration via a second access network with the second core network (e.g., EPC).

The UE 102 detects (at 308) an emergency indication.

In response to the emergency indication, the UE 102 initiates (at 310) a call for emergency services via the second access network.

In further or alternative examples, the UE 102 can determine that the indication (or another indication) indicates support for interworking between the first core network and the second core network without an inter-core network interface (e.g., the N26 interface between the AMF and the MME). This indicator can also be based on an indicator in Table 1 above for example. The interworking between the first and second core networks without the N26 interface can be provided by presence of a PDN-GW collocated in both the 5GS and EPS, for example.

In further or alternative examples, the UE 102 can, subsequent to detecting (at 308) the emergency indication, not perform emergency service fallback.

In further or alternative examples, the second registration via the second access network with the second core network comprises not performing emergency service fallback.

In further or alternative examples, the second registration via the second access network with the second core network comprises an attach procedure.

In further or alternative examples, the UE 102 can determine support of emergency services fallback for 3GPP access by the 5GC.

In further or alternative examples, the UE 102 can determine lack of support of emergency services fallback for 3GPP access by the 5GC.

In further or alternative examples, the UE 102 can attempt the second registration by attempting a combined registration (e.g., by performing a combined attach procedure) with the second core network, where the second core network is defined to provide at least one of EPS services or fallback to the CS domain (e.g., CSFB).

In further or alternative examples, the UE 102 can attempt the second registration by not attempting a TAU procedure with the second core network.

In further or alternative examples, the UE 102 can initiate the call for emergency services via the second access network by sending a request for fallback to the CS domain.

In further or alternative examples, the UE 102 can initiate the call for emergency services by sending one of a SETUP message or an EMERGENCY SETUP message, which causes the call to be handled by an MSC.

In further or alternative examples, the UE 102 can initiate the call for emergency services by sending one of a first EXTENDED SERVICE REQUEST message indicating emergency or a second EXTENDED SERVICE REQUEST message. The first or the second EXTENDED SERVICE REQUEST message is sent to the MME of the EPC. This can be part of the emergency service CSFB.

The second EXTENDED SERVICE REQUEST message does not indicate emergency.

In further or alternative examples, the UE 102 can, in response to the emergency indication, select a domain (e.g., CS domain or PS domain). The call is initiated via the second access network in response to determining that the domain selected is the PS domain.

In further or alternative examples, the UE 102 can initiate the call for emergency services by at least one of:

if the domain selected is the CS domain, selecting a third access network, sending a service request message to the second core network, the message requesting to fallback to the third access network, or if the domain selected is the PS domain, initiating an call via the second access network.

In further or alternative examples, wherein the call via the second access network comprises sending a SIP INVITE message including a URI that uses the "urn" (uniform resource name) scheme.

In further or alternative examples, wherein the URI includes the text "sos".

In further or alternative examples, wherein the UE operates in single-registration mode, and subsequent to detecting (at 308) the emergency indication, proceeds to operate in dual-registration mode.

In further or alternative examples, wherein the UE subsequent to ending the call for emergency service, proceeds to operate in single-registration mode.

In some implementations, the UE selects a packet switched domain in response to detecting an emergency indicator. The UE determines that the EPC does not support emergency (bearer) service(s) (e.g., based on the indicator in Table 2). Then the UE uses a circuit switched domain of UTRAN or GERAN to perform the call.

The following provides a modification of a section of 3GPP TS 24.229 (underlined text represents new additions), to support Implementation 2.1 above.

3GPP TS 24.229:

U.2.2.6.4 Attempting Emergency Services in Single-Registration Mode

NOTE: This subclause covers only the case where the UE selects the IM CN subsystem in accordance with the conventions and rules specified in 3GPP TS 23.167 [4B] and describes the IP-CAN specific procedure. It does not preclude the use of CS domain. When a CS system based on 3GPP TS 24.008 [8] is to be used, clause B.5 applies.

When the UE operates in single-registration mode as described in 3GPP TS 24.501 [258] and the UE recognises that a call request is an emergency call, if:

1) the IM CN subsystem is selected in accordance with the conventions and rules specified in 3GPP TS 23.167 [4B]; and 2) the UE is currently registered to the 5GS services while the UE is in an NR cell connected to 5GCN;

then the following treatment is applied:

1) if the EMC indicates "Emergency services not supported":

a0) if the IWK N26 bit in the 5GS network feature support IE is set to "interworking without N26 interface supported", the UE:

i) if the UE supports dual-registration mode, may proceed to operate in dual-registration mode:

ii) attempts to select an E-UTRA cell connected to EPC. If the UE finds a suitable E-UTRA cell connected to EPC and the network provides the UE with the EMC BS set to "emergency bearer services in S1 mode supported" as described in 3GPP TS 24.301 [8J], the UE shall perform the procedures as described in subclause L.2.2.6 to activate an EPS bearer context to perform emergency registration, with the exception that the UE shall not perform the EPS tracking area update procedure as described in 3GPP TS 23.502 [257A]: and iii) if the a PDN connection for emergency bearer services is released and the UE entered dual-registration mode in item i), may detach and proceed to operate in single-registration mode.

a) . . . ;

When the UE operates in single-registration mode as described in 3GPP TS 24.501 [258] and the UE recognises that a call request is an emergency call, if:

1) the IM CN subsystem is selected in accordance with the conventions and rules specified in 3GPP TS 23.167 [4B]; and 2) the UE is currently registered to the 5GS services while the UE is in an E-UTRA cell connected to 5GCN;

then the following treatment is applied:

1) if the EMC indicates "Emergency services not supported":

a0) if the IWK N26 bit in the 5GS network feature support IE is set to "interworking without N26 interface supported", the UE:

i) if the UE supports dual-registration mode, may proceed to operate in dual-registration mode:

ii) attempts to select an E-UTRA cell connected to EPC. If the UE finds a suitable E-UTRA cell connected to EPC and the network provides the UE with the EMC BS set to "emergency bearer services in S1 mode supported" as described in 3GPP TS 24.301 [8J], the UE shall perform the procedures as described in subclause L.2.2.6 to activate an EPS bearer context to perform emergency registration, with the exception that the UE shall not perform the EPS tracking area update procedure as described in 3GPP TS 23.502 [257A]: and iii) if the a PDN connection for emergency bearer services is released and UE entered dual-registration mode in item i), may detach and proceed to operate in single-registration mode.

a) . . . ;

U.2.2.6.5 Attempting Emergency Services in Dual-Registration Mode

NOTE 1: This subclause covers only the case where the UE selects the IM CN subsystem in accordance with the conventions and rules specified in 3GPP TS 23.167 [4B] and describes the IP-CAN specific procedure. It does not preclude the use of CS domain. When a CS system based on 3GPP TS 24.008 [8] is to be used, clause B.5 applies.

When the UE operates in dual-registration mode as described in 3GPP TS 24.501 [258] and the UE recognizes that a call request is an emergency call, if:

1) the IM CN subsystem is selected in accordance with the conventions and rules specified in 3GPP TS 23.167 [4B]; and 2) the UE currently camps on an NR cell connected to 5GCN;

then the following treatment is applied:

1) if the EMC indicates "Emergency services not supported" and:

a) if the UE is attached for EPS services and the network provided the UE with the EMC BS set to "emergency bearer services in S1 mode supported" as described in 3GPP TS 24.301 [8J], the UE shall perform the procedures as described in subclause L.2.2.6 to establish a PDN connection for emergency bearer services; or b) if the UE is not attached for EPS services, then:

i) if the network indicates "interworking without N26 interface supported" (see 3GPP TS 24.501 [258D], the UE shall attempt to select an E-UTRA cell connected to EPC. If the UE finds a suitable E-UTRA cell connected to EPC and the network provides the UE with the EMC BS set to "emergency bearer services in S1 mode supported" as described in 3GPP TS 24.301 [8J], the UE shall perform the procedures as described in subclause L.2.2.6 to activate an EPS bearer context to perform emergency registration.

if the a PDN connection for emergency bearer services is released, the UE may detach from the EPC:

ii) otherwise, and:

A) if emergency services fallback is available (i.e. "ESFB is Y" as described in 3GPP TS 23.167 [4B]) and the UE supports emergency services fallback as specified in 3GPP TS 23.501 [257], the UE shall attempt emergency services fallback as specified in 3GPP TS 24.501 [258]. If the UE receives from the lower layers an indication that the emergency services fallback attempt failed, the UE may behave as described in bullet ii) below assuming that the emergency services fallback is not available; or B) if emergency services fallback is not available (i.e. "ESFB is N" as described in 3GPP TS 23.167 [4B]) or the UE does not support emergency services fallback as specified in 3GPP TS 23.501 [257], the UE shall attempt to select an E-UTRA cell connected to EPC. If the UE finds a suitable E-UTRA cell connected to EPC and the network provides the UE with the EMC BS set to "emergency bearer services in S1 mode supported" as described in 3GPP TS 24.301 [8J], the UE shall perform the procedures as described in subclause L.2.2.6 to activate an EPS bearer context to perform emergency registration;

2) . . . :

When the UE operates in dual-registration mode as described in 3GPP TS 24.501 [258] and the UE recognizes that a call request is an emergency call, if:

1) the IM CN subsystem is selected in accordance with the conventions and rules specified in 3GPP TS 23.167 [4B]; and 2) the UE currently camps on an E-UTRA cell connected to 5GCN and the UE is not attached for EPS services;

then the following treatment is applied:

1) if the EMC indicates "Emergency services not supported" and:

a) if the network indicates "interworking without N26 interface supported" (see 3GPP TS 24.501 [258]), the UE shall attempt to select an E-UTRA cell connected to EPC. If the UE finds a suitable E-UTRA cell connected to EPC and the network provides the UE with the EMC BS set to "emergency bearer services in S1 mode supported" as described in 3GPP TS 24.301 [8J], the UE shall perform as described in subclause L.2.2.6 to activate an EPS bearer context to perform emergency registration.

if the a PDN connection for emergency bearer services is released, the UE may detach from the EPC;

b) otherwise, and:

i) if emergency services fallback is available (i.e. "ESFB is Y" as described in 3GPP TS 23.167 [4B]) and the UE supports emergency services fallback as specified in 3GPP TS 23.501 [257], the UE shall attempt emergency services fallback as specified in 3GPP TS 24.501 [258]. If the UE receives from the lower layers an indication that the emergency services fallback attempt failed, the UE may behave as described in bullet b) below assuming that the emergency services fallback is not available; or ii) if emergency services fallback is not available (i.e. "ESFB is N" as described in 3GPP TS 23.167 [4B]) or the UE does not support emergency services fallback as specified in 3GPP TS 23.501 [257], the UE shall attempt to select an E-UTRA cell connected to EPC. If the UE finds a suitable E-UTRA cell connected to EPC, the UE shall perform the procedures as described in subclause L.2.2.6 to activate an EPS bearer context to perform emergency registration; and

2) . . . :

When the UE, capable of being concurrently registered with different first and second core networks, UE 102 attempts (at 406) a second registration via the second access network with the second core network (e.g., EPC), the second registration may comprise a first attach procedure or a second attach procedure, wherein the second attach procedure is a combined attach procedure.

When the UE, capable of being concurrently registered with different first and second core networks, UE 102 attempts (at 406) the first attach procedure or the second attach procedure, the UE may need to use the S1 NAS signaling connection for transmitting a further NAS message subsequent to the attach procedure being successful. To this end, the UE may include an indicator in the ATTACH message, the indicator indicating that keeping the S1 NAS (signaling) connection is required after the completion of the registration procedure. The further NAS message may be a SERVICE REQUEST message.

4.2.2 Implementation 2.2: Attempt Dual Registration Even Though N26 Interface Supported The following describes examples where dual registration can be attempted even if interworking using the N26 interface is supported. Implementation 2.2 describes further implementations based on Implementation 2.1.

In further implementations, the UE 102 attempts the second registration by providing the second core network with a first indicator, the first indicator indicating the second registration is attempted for emergency.

In further implementations, the UE 102 attempts the second registration by providing the second core network with a second indicator, the second indicator indicating to the second core network that one or more existing protocol data unit (PDU) sessions or packet data network (PDN) connections at the first core network are to be suspended. The second core network, e.g., the second core network's MME, upon receiving the second indicator, indicates to the first core network to suspend the one or more PDU sessions.

In further implementations, the UE 102 attempts the second registration by providing the second core network with a third indicator, the third indicator indicating to the second core network that the registration via the first access network with the first core network is to be terminated. The second core network, e.g., the second core network's MME, upon receiving the third indicator, indicates to a collocated home subscriber server (HSS) and user data management (UDM) system to cancel the registration of the UE in the first core network, e.g., the first core network's AMF.

In further implementations, the UE 102 attempts the second registration by providing the second core network with a fourth indicator, the fourth indicator indicating to the second core network that the registration via the first access network with the first core network is to be kept. The second core network, e.g., the second core network's MME, upon receiving the fourth indicator, indicates to a collocated HSS and UDM system not to cancel the registration of the UE in the first core network, e.g., a first core network's AMF.

further implementations, the UE 102 returns to an access network (e.g., one of NR access network or E-UTRA or WLAN or non-3GPP AN) of the first core network after termination of the call.

4.2.3 Implementation 2.3: (Concurrently) Dual Registered Devices for EPS Services Only Implementation 2.3 is used to address Issue 1 and Issue 2 above.

To enable the performance of Implementation 2.3, the UE 102 is assumed to be capable of being concurrently registered with different first and second core networks (e.g., the 5GC and the EPC).

Figure 4:
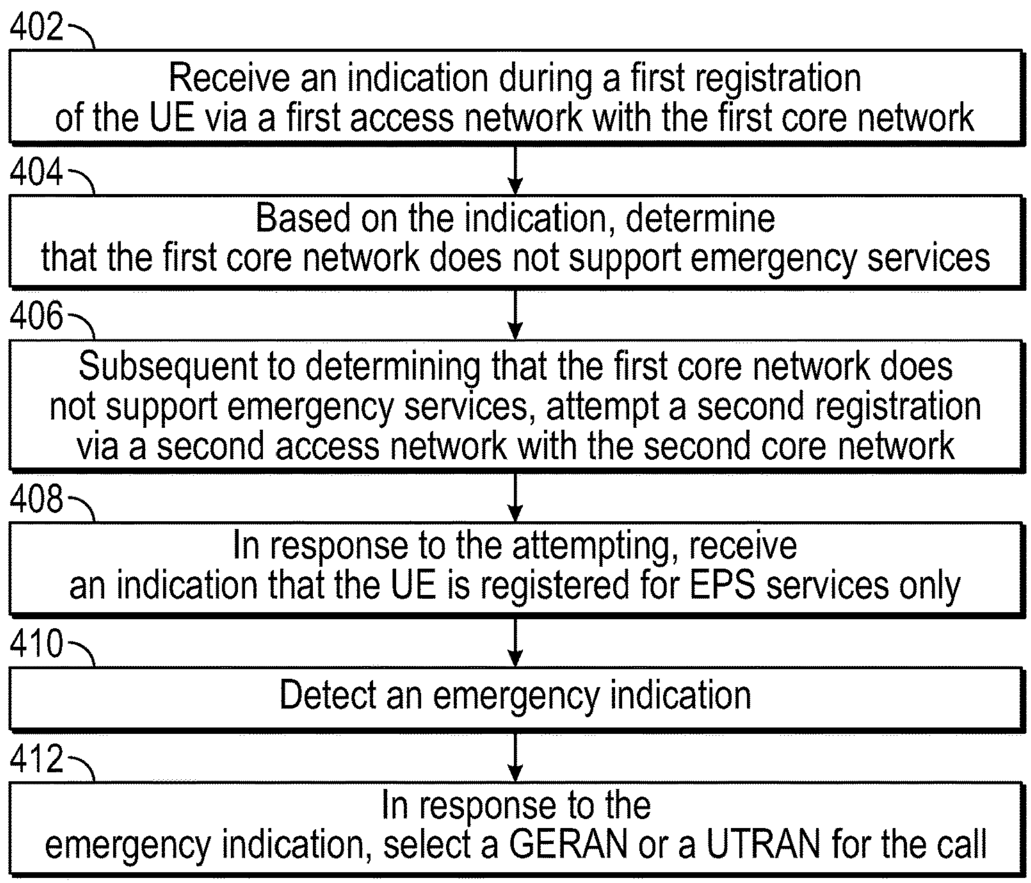

FIG. 4 is a flow diagram of a process of the UE 102 according to some examples for Implementation 2.3.

The UE 102 receives (at 402) an indication (such as in a response message) during a registration of the UE 102 via a first access network with the first core network (e.g., 5GC).

Based on the indication, the UE 102 determines (at 404) that the first core network does not support emergency services.

In response to determining that the first core network does not support emergency services, the UE 102 attempts (at 406) a second registration via a second access network with the second core network (e.g., EPC).

In response to the attempting, the UE 102 receives (at 408) an indication that the UE is registered for EPS services only.

The UE 102 detects (at 410) an emergency indication. In response to the emergency indication, the UE 102 selects (at 412) a GERAN or a UTRAN for the call.

The GERAN or the UTRAN provides access to the CS domain.

The UE can initiate a call for emergency services by sending one of a SETUP message or an EMERGENCY SETUP message.

In first examples, the following provides a modification of a section of 3GPP TS 24.301 (underlined text represents new additions), to support Implementation 2.3 above.

In second examples, the following provides a modification of a section of 3GPP TS 24.229 (underlined text represents new additions), to support Implementation 2.3 above.

The first and second examples to support Implementation 2.3 can be combined.

3GPP TS 24.301:

5.5.1.3.4.3 Combined attach successful for EPS services only

Apart from the actions on the tracking area updating attempt counter, the description for attach for EPS services as specified in subclause 5.5.1.2.4 shall be followed. In addition, the following description for attach for non-EPS services applies.

If there is a request for emergency services pending, a CS fallback emergency call pending or a CS fallback call pending due to emergency domain selection or emergency services fallback (see 3GGP TS 23.502), then the UE shall attempt to select GERAN or UTRAN radio access technology, select between EMERGENCY SETUP message or a SETUP message, and proceed with appropriate MM or GMM specific procedures.

The UE receiving the ATTACH ACCEPT message takes one of the following actions depending on the EMM cause value:

3GPP TS 24.229:

U.2.2.6.5 Emergency Services in Dual Registration Mode

. . . :

NOTE x: In case the UE finds a suitable E-UTRA cell connected to EPC and the network provides the UE with the EMC BS set to "emergency bearer services in S1 mode not supported" and a combined tracking area updating or attach Procedure was successful for EPS services only, then CSFB cannot be applied to use the CS domain. When the combined tracking area updating or attach procedure are unsuccessful or successful for EPS services only, then an access providing access to CS domain is selected. When a CS system based on 3GPP TS 24.008 [8] is to be used, clause B.5 applies.

2) . . . :

NOTE v: In case the UE finds a suitable E-UTRA cell connected to EPC and the network provides the UE with the EMC BS set to "emergency bearer services in S1 mode not supported" and a combined tracking area updating or attach procedure was successful for EPS services only, then CSFB cannot be applied to use the CS domain. When the combined tracking area updating or attach procedure are unsuccessful or successful for EPS services only, then an access providing access to CS domain is selected. When a CS system based on 3GPP TS 24.008 [8] is to be used, clause B.5 applies.

4.3 Implementation 3

Implementation 3 is provided to address Issue 3 discussed further above.

A UE capable of 5G operations should be able indicate the type of fallback the UE wishes to perform. Only the UE knows the domain the UE has to use for the particular emergency service type identified by the emergency number.

Figure 5:
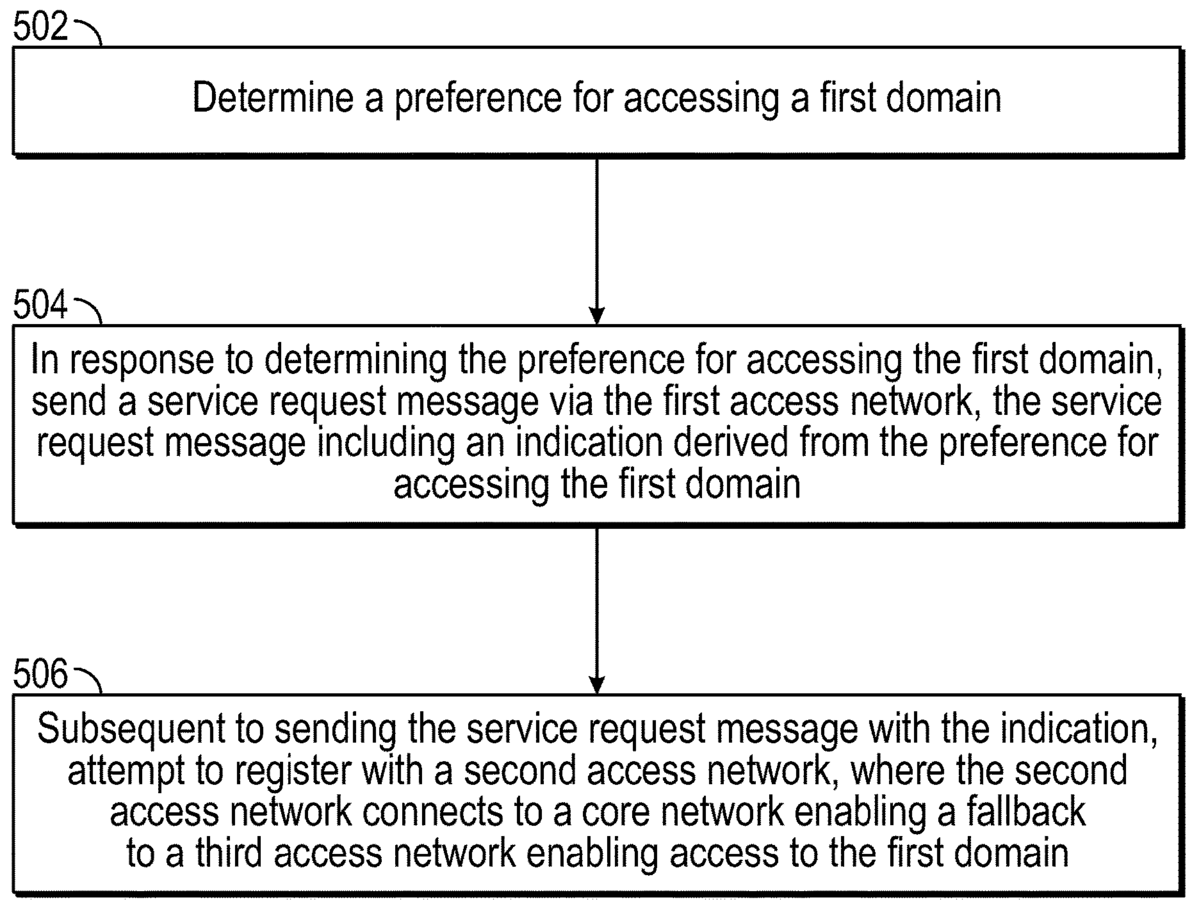

FIG. 5 is a flow diagram of a process of the UE 102 according to some examples for Implementation 3.

It is assumed that the UE 102 is registered via a first access network. The UE 102 determines (at 502) a preference for accessing a first domain (e.g., a CS domain).

In response to determining the preference for accessing the first domain, the UE 102 sends (at 504) a service request message via the first access network, the service request message including an indication. The indication is derived from the preference for accessing the first domain.

Subsequent to sending the service request message with the indication, the UE 102 attempts (at 506) to register with a second access network, where the second access network connects to a core network enabling a fallback to a third access network enabling access to the first domain.

In some examples, the determining of the preference is responsive to detecting an emergency indication.

The service request message can be a NAS message that includes a Service Type information element (IE), such as according to 3GPP TS 24.501. The service type IE can include the indicator derived from the domain selection. Other examples of indicator encoding may exist.

The following provides a modification of a section of 3GPP TS 24.501 (underlined text represents new additions).

3GPP TS 24.501:

9.11.3.50 Service type

The purpose of the service type information element is to specify the purpose of the service request procedure.

The service type is a type 1 information element.

The service type information element is coded as shown in figure 9.11.3.50.1 and table 9.11.3.50.1.

Figure 9.11.3.50.1

| Service type information element | | | | | | | | |
|---|---|---|---|---|---|---|---|---|
| 8 | 7 | 6 | 5 | 4 | 3 | 2 | 1 | |
| Service type 1E1 | | | | Service type value | | | | octet 1 |

TABLE 9.11.3.50.1

Service type information element

Service type value (octet 1)
Service type value
Bits

| 4 | 3 | 2 | 1 | |
|---|---|---|---|---|
| 0 | 0 | 0 | 0 | signalling |
| 0 | 0 | 0 | 1 | data |
| 0 | 0 | 1 | 0 | mobile terminated services |
| 0 | 0 | 1 | 1 | emergency services |
| 0 | 1 | 0 | 0 | emergency services fallback |
| 0 | 1 | 0 | 1 | high priority access |
| 0 | 1 | 1 | 0 | elevated signalling |
| 0 | 1 | 1 | 1 | emergency services system fallback |
| 1 | 0 | 0 | 0 | system fallback |
| 1 | 0 | 0 | 1 | unused; shall be interpreted as "data", if received by the network |
| 1 | 0 | 1 | 0 | unused; shall be interpreted as "data", if received by the network |
| 1 | 0 | 1 | 1 | unused; shall be interpreted as "data", if received by the network |

All other values are reserved.

System Architecture

Figure 6:
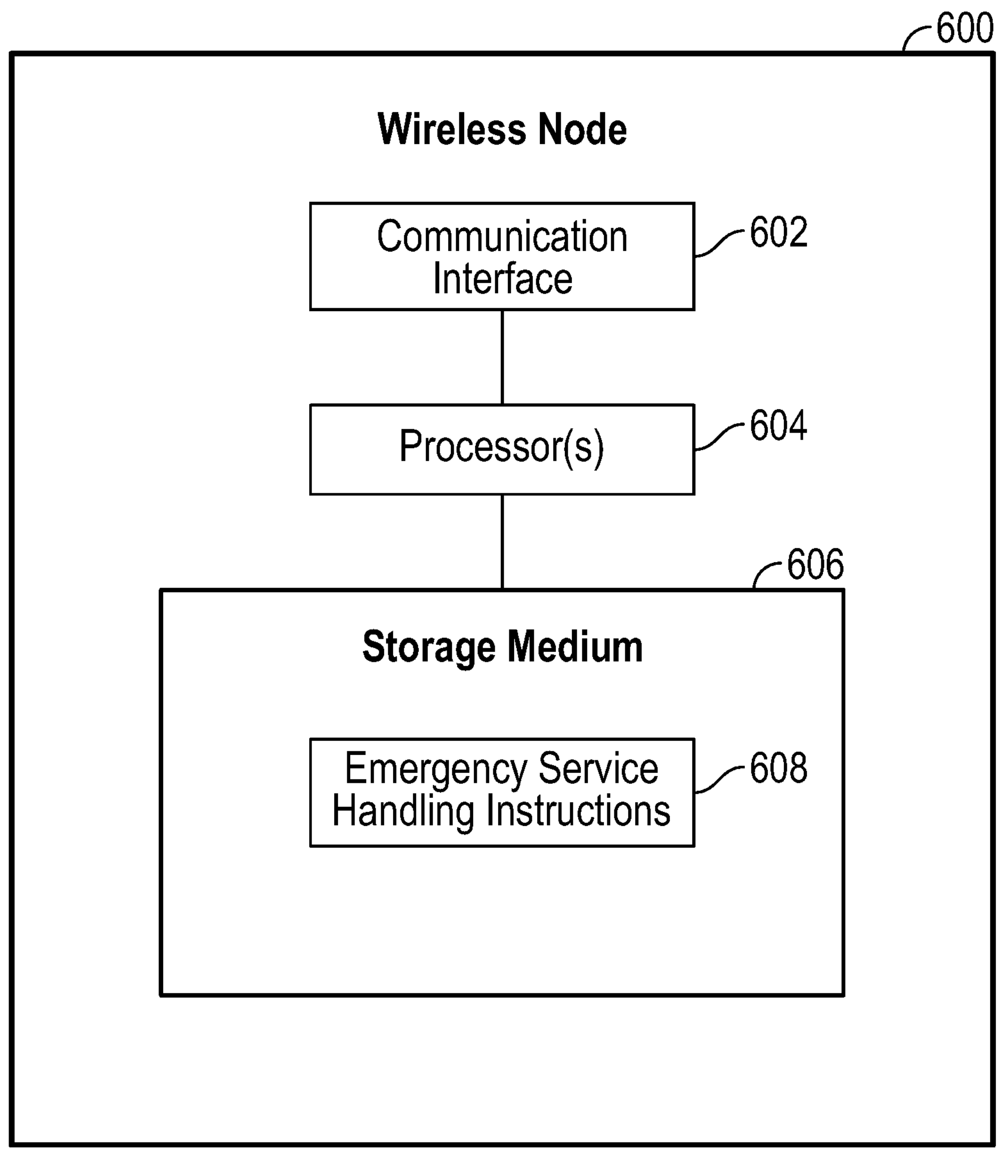
FIG. 6 is a block diagram of a wireless node according to some implementations of the present disclosure.

FIG. 6 is a block diagram of a wireless node 600, such as a UE or a network node (in an access network or core network).

The wireless node 600 includes a communication interface 602 to communicate over a communications link. The communication interface 602 can include a wireless interface or a wired interface.

The wireless node 600 further includes one or more hardware processors 604. A hardware processor can include a microprocessor, a core of a multi-core microprocessor, a microcontroller, a programmable integrated circuit, a programmable gate array, a digital signal processor, or another hardware processing circuit.

The wireless node 600 further includes a non-transitory machine-readable or computer-readable storage medium 606 storing machine-readable instructions executable on the one or more hardware processors 604 to perform various tasks. The machine-readable instructions can include emergency services handling instructions 608 to perform various tasks as discussed herein.

The storage medium 606 can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disc (CD) or a digital video disc (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In accordance with some implementations, a UE that is capable of dual registration with a first core network and a second core network performs the following: receives a first indication during a first registration of the UE via a first access network with the first core network; determines based on the first indication that emergency services are not supported by the first core network; attempts a second registration via a second access network with the second core network; detects an emergency indication; and initiates a call in response to the emergency indication via an access network different from the first access network.

In further examples, the first indication that emergency services are not supported by the first core network comprises an indication that emergency services are not supported by an access network connected to the first core network.

In further examples, the attempting the second registration avoids a TAU procedure.

In further examples, the attempting the second registration comprises one of an attach procedure and a combined attach procedure.

In further examples, the attempting the second registration comprises indicating, to the second core network, that the UE may need to use an S1 NAS signaling connection for transmitting a further NAS message subsequent to the second registration being successful; and obtaining the S1 NAS signaling connection when the second registration is successful.

In further examples, the UE detects, in response to the attempting the second registration, that the second core network does not support emergency (bearer) service(s).

In further examples, in response to detecting that the second core network does not support emergency (bearer) service(s), the UE initiates the call in response to the emergency indication via an access network different from the second access network.

In further examples, the UE detects, in response to the attempting the second registration, that the UE is successfully registered for EPS services only.

In further examples, the UE does not perform emergency service fallback prior to the attempting or subsequent to the determining.

In further examples, the UE determines, based on a second indication received during the first registration, one of: emergency fallback is supported by at least one access connected to the first core network, or emergency fallback is not supported by the first core network.

In further examples, the UE determines, based on a third indication received during the first registration, one of:

interworking without interface between the first core network, comprising an AMF, and the second core network, comprising an MME, supported, or interworking without interface between the first core network, comprising the AMF, and the second core network, comprising the MME, not supported.

In further examples, the UE attempts the second registration by attempting a combined registration with the second core network that provides at least one of EPS services or fallback to a CS domain.

In further examples, the UE initiates a call in response to the emergency indication by one of: sending a request for fallback to a circuit switched domain, or sending a SETUP message or an EMERGENCY SETUP message, or sending a first EXTENDED SERVICE REQUEST message indicating emergency or a second EXTENDED SERVICE REQUEST message, wherein the second EXTENDED SERVICE REQUEST message does not indicate emergency.

In further examples, the UE initiates the call in response to the emergency indication by: in response to a domain selected for the call being a circuit switched domain, sending a service request message to the second core network, the service request message requesting to fallback to a third access network, and in response to the domain selected for the call being a packet switched domain, initiating the call via the second access network.

In further examples, the UE attempts the second registration that comprises one or more of: providing the second core network with a first indicator, the first indicator indicating the second registration is attempted for emergency, or providing the second core network with a second indicator, the second indicator indicating to the second core network that one or more existing protocol data unit (PDU) sessions or packet data network (PDN) connections at the first core network are to be suspended, or providing the second core network with a third indicator, the third indicator indicating to the second core network that the registration via the first access network with the first core network is to be terminated, or providing the second core network with a fourth indicator, the fourth indicator indicating to the second core network that the registration via the first access network with the first core network is to be kept.

In further examples, the UE returns to an access network of the first core network after one of: release of a SIP registration established prior to the call, wherein the call comprises a session initiated using SIP; or release of a PDN connection for the call, the PDN connection via the second core network, wherein the call comprises a session initiated using SIP; or termination of the call.

In some aspects, a UE determines a preference for accessing a first domain; in response to determining the preference for accessing the first domain, send a service request message via the first access network, the service request message including an indication derived from the preference for accessing the first domain; and subsequent to sending the service request message with the indication, attempt to register with a second access network, wherein the second access network connects to a core network enabling a fallback to a third access network enabling access to the first domain.

In further examples, the determining is responsive to an emergency indication.

In further examples, the first domain is a circuit switched domain.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method of a user equipment (UE) registered with a fifth generation (5G) core network, comprising:

in response to an emergency indication, selecting a first domain intended for a call responsive to the emergency indication;

subsequent to selecting the first domain, attempting a combined registration with a second core network different from the 5G core network;

in response to attempting the combined registration, receiving a further indication that the UE is registered for packet switched services only; and in response to the further indication, selecting an access network connected to a third core network to perform the call, wherein performing the call includes initiating, by the UE, the call by sending a SETUP message or an EMERGENCY SETUP message to the third core network, and the SETUP message or the EMERGENCY SETUP message indicates that the call uses a mobile switching center (MSC) in a circuit switched domain.

2. The method of claim 1, wherein the second core network is an Evolved Packet Core (EPC) of an Evolved Packet System (EPS), and wherein the UE being registered for packet switched services only comprises the UE being registered for EPS services only.

3. The method of claim 1, wherein the further indication indicates that the UE was successfully registered with the second core network.

4. The method of claim 1, wherein the selecting of the access network connected to the third core network avoids using fallback to the circuit switched domain.

5. The method of claim 1, wherein the second core network provides at least one of packet switched services or fallback to the circuit switched domain.

6. The method of claim 1, wherein:

the first domain is a packet switched domain;

the UE determines the second core network does not support emergency bearer service(s); and the UE uses the circuit switched domain of the third core network to perform the call.

7. The method of claim 1, wherein the first domain is a circuit switched domain.

8. The method of claim 1, wherein the selected access network provides access to the circuit switched domain.

9. The method of claim 1, wherein the further indication is received from the second core network.

10. The method of claim 1, wherein the UE is registered with an Access and Mobility Management Function (AMF) of the 5G core network.

11. The method of claim 1, wherein the selected access network comprises a Universal Mobile Telecommunications Service (UMTS) Terrestrial Radio Access Network (UTRAN), or a GSM Enhanced Data Rates for GSM Evolution (EDGE) Radio Access Network (GERAN).

12. The method of claim 1, wherein the UE is registered with the 5G core network using a non-access stratum (NAS) procedure, wherein the combined registration attempted with the second core network is a NAS combined registration, and wherein the further indication received by the UE is contained in a NAS message.

13. A user equipment (UE) comprising:

a processor; and a non-transitory storage medium storing instructions executable on the processor to:

register with a fifth generation (5G) core network;

in response to an emergency indication, select a first domain intended for a call responsive to the emergency indication;

subsequent to selecting the first domain, attempt a combined registration with a second core network different from the 5G core network to which the UE is registered;

in response to attempting the combined registration, receive a further indication, contained in a message from the second core network, that the UE is registered for packet switched services only; and in response to the further indication that the UE is registered for packet switched services only, select an access network connected to a third core network to perform the call, wherein performing the call includes initiating the call by sending a SETUP message or an EMERGENCY SETUP message to the third core network, and the SETUP message or the EMERGENCY SETUP message indicates that the call uses a mobile switching center (MSC) in a circuit switched domain.

14. The UE of claim 13, wherein the second core network is an Evolved Packet Core (EPC) of an Evolved Packet System (EPS), and wherein the UE being registered for packet switched services only comprises the UE being registered for EPS services only.

15. The UE of claim 14, wherein the UE being registered for EPS services only comprises one of the UE being attached for EPS services only and a combined tracking area update attempted by the UE being successful for EPS services only.

16. The UE of claim 13, wherein the further indication indicates that the UE was successfully registered with the second core network.

17. The UE of claim 13, wherein the selecting of the access network connected to the third core network avoids using fallback to the circuit switched domain.

18. The UE of claim 13, wherein the second core network provides at least one of packet switched services or fallback to the circuit switched domain.

19. The UE of claim 13, wherein the selected access network comprises a Universal Mobile Telecommunications Service (UMTS) Terrestrial Radio Access Network (UTRAN), or a GSM Enhanced Data Rates for GSM Evolution (EDGE) Radio Access Network (GERAN).

20. The UE of claim 13, wherein the instructions are executable on the processor to register the UE with the 5G core network using a non-access stratum (NAS) procedure, wherein the combined registration attempted with the second core network is a NAS combined registration, and wherein the further indication received by the UE is contained in a NAS message.

21. The UE of claim 13, wherein attempting the combined registration comprises one of an attempt of a combined attach and an attempt of a combined tracking area update.

22. A non-transitory machine-readable storage medium comprising instructions that upon execution cause a user equipment (UE) to:

register, using a non-access stratum (NAS) procedure, with a fifth generation (5G) core network;

in response to an emergency indication, select a first domain intended for a call responsive to the emergency indication;

subsequent to selecting the first domain, attempt a NAS combined registration with a second core network different from the 5G core network to which the UE is registered;

in response to attempting the NAS combined registration, receive a further indication, contained in a NAS message, that the UE is registered for packet switched services only; and in response to the further indication that the UE is registered for packet switched services only, select an access network connected to a third core network to perform the call, wherein performing the call includes initiating the call by sending a SETUP message or an EMERGENCY SETUP message to the third core network, and the SETUP message or the EMERGENCY SETUP message indicates that the call uses a mobile switching center (MSC) in a circuit switched domain.

23. The non-transitory machine-readable storage medium of claim 22, wherein the second core network is an Evolved Packet Core (EPC) of an Evolved Packet System (EPS), and wherein the UE being registered for packet switched services only comprises the UE being registered for EPS services only.

24. The non-transitory machine-readable storage medium of claim 22, wherein the selected access network comprises a Universal Mobile Telecommunications Service (UMTS) Terrestrial Radio Access Network (UTRAN), or a GSM Enhanced Data Rates for GSM Evolution (EDGE) Radio Access Network (GERAN).

* * * * *